United States Patent
Iwaguchi et al.

(10) Patent No.: US 11,428,866 B2
(45) Date of Patent: Aug. 30, 2022

(54) METHOD FOR MANUFACTURING OPTICAL FIBER WITH OXYGEN-STRENGTHENED UV-RESIN COATING

(71) Applicant: SUMITOMO ELECTRIC INDUSTRIES, LTD., Osaka (JP)

(72) Inventors: Noriaki Iwaguchi, Osaka (JP); Haruki Okuyama, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 514 days.

(21) Appl. No.: 16/583,425

(22) Filed: Sep. 26, 2019

(65) Prior Publication Data

US 2020/0103589 A1    Apr. 2, 2020

(30) Foreign Application Priority Data

Sep. 27, 2018    (JP) .............................. JP2018-182358

(51) Int. Cl.
*G02B 6/02* (2006.01)
*C03C 25/326* (2018.01)
*C03C 25/106* (2018.01)

(52) U.S. Cl.
CPC ........ *G02B 6/02395* (2013.01); *C03C 25/106* (2013.01); *C03C 25/326* (2013.01)

(58) Field of Classification Search
None
See application file for complete search history.

(56) References Cited

U.S. PATENT DOCUMENTS

| | | | | |
|---|---|---|---|---|
| 3,804,705 A | * | 4/1974 | Kishikawa | ............ B32B 27/304 428/517 |
| 4,540,597 A | * | 9/1985 | Nagasaki | ............ C03C 25/1065 427/501 |
| 4,575,437 A | * | 3/1986 | Kojima | ............... C03C 25/1065 264/447 |
| 5,330,786 A | * | 7/1994 | Nonaka | ............... C03C 25/1065 427/302 |
| 5,459,175 A | * | 10/1995 | Woods | ................. C08G 73/028 522/183 |
| 5,761,363 A | * | 6/1998 | Mills | .................... G02B 6/4498 385/114 |

(Continued)

FOREIGN PATENT DOCUMENTS

| | | |
|---|---|---|
| JP | S63-151648 A | 6/1988 |
| JP | 2006-249265 A | 9/2006 |
| JP | 2012-136401 A | 7/2012 |

*Primary Examiner* — Andrew Jordan
(74) *Attorney, Agent, or Firm* — Faegre Drinker Biddle & Reath LLP

(57) ABSTRACT

A method for manufacturing an optical fiber is a method for manufacturing an optical fiber including a glass fiber, and a coating resin layer that coats the glass fiber by being in contact with the glass fiber. The method includes a step of increasing a dissolved oxygen concentration in an ultraviolet ray curable resin composition, a step of applying the ultraviolet ray curable resin composition, in which the dissolved oxygen concentration is increased, onto the glass fiber, and a step of curing the ultraviolet ray curable resin composition by irradiating the ultraviolet ray curable resin composition that is applied onto the glass fiber with an ultraviolet ray.

3 Claims, 2 Drawing Sheets

(56) References Cited

U.S. PATENT DOCUMENTS

| | | | | |
|---|---|---|---|---|
| 6,035,088 | A * | 3/2000 | Chandraiah | G02B 6/4403 156/714 |
| 6,134,364 | A * | 10/2000 | DeFabritis | G02B 6/4471 385/114 |
| 6,236,790 | B1 * | 5/2001 | Okada | G02B 6/4433 385/103 |
| 6,316,516 | B1 * | 11/2001 | Chien | C09D 4/06 522/182 |
| 6,326,406 | B1 * | 12/2001 | De Tommaso | A61K 31/05 514/731 |
| 6,376,571 | B1 * | 4/2002 | Chawla | C08F 290/062 385/115 |
| 6,489,376 | B1 * | 12/2002 | Khudyakov | C03C 25/1065 522/182 |
| 6,683,151 | B1 * | 1/2004 | Loontjens | C08G 83/008 385/115 |
| 6,887,918 | B2 * | 5/2005 | Khudyakov | C08F 290/06 427/508 |
| 7,085,466 | B2 * | 8/2006 | Roba | G02B 6/02395 385/128 |
| 7,200,310 | B2 * | 4/2007 | Roba | G02B 6/02395 385/128 |
| 7,317,858 | B2 * | 1/2008 | Roba | G02B 6/02033 385/128 |
| 8,426,021 | B2 * | 4/2013 | Cattron | G02B 1/12 522/182 |
| 8,470,213 | B2 * | 6/2013 | Okada | B29D 11/00875 425/114 |
| 8,548,294 | B2 * | 10/2013 | Toge | G02B 6/4433 385/114 |
| 8,734,945 | B2 * | 5/2014 | Cattron | C09D 175/16 522/182 |
| 8,781,282 | B2 * | 7/2014 | Terruzzi | G02B 6/02395 385/127 |
| 10,782,495 | B2 * | 9/2020 | Fallahmohammadi | G02B 6/4429 |
| 10,882,783 | B2 * | 1/2021 | Tanaka | C03C 25/24 |
| 11,073,655 | B2 * | 7/2021 | Iwaguchi | G02B 6/02395 |
| 11,256,056 | B2 * | 2/2022 | Isaji | C03C 25/326 |
| 2002/0107291 | A1 * | 8/2002 | De Tommaso | A61K 31/05 514/731 |
| 2003/0045599 | A1 * | 3/2003 | Khudyakov | C08F 290/067 522/96 |
| 2004/0022510 | A1 * | 2/2004 | Suzuki | G02B 6/4403 385/128 |
| 2004/0115436 | A1 * | 6/2004 | Komiya | C03C 25/50 428/411.1 |
| 2004/0170364 | A1 * | 9/2004 | Chiasson | G02B 6/4404 385/106 |
| 2005/0207715 | A1 * | 9/2005 | Roba | C03C 25/1065 385/128 |
| 2005/0226573 | A1 * | 10/2005 | Okuno | G02B 6/02004 385/114 |
| 2005/0226582 | A1 * | 10/2005 | Nagelvoort | C09D 4/06 385/128 |
| 2006/0072889 | A1 * | 4/2006 | Roba | G02B 6/02395 385/128 |
| 2006/0228083 | A1 * | 10/2006 | Roba | G02B 6/02395 385/128 |
| 2007/0191505 | A1 * | 8/2007 | Takahashi | C08G 18/672 522/178 |
| 2008/0254288 | A1 * | 10/2008 | Yamaguchi | C03C 25/106 525/123 |
| 2009/0080851 | A1 * | 3/2009 | Nagelvoort | C09D 4/06 385/144 |
| 2012/0321265 | A1 * | 12/2012 | Terruzzi | G02B 6/02395 385/128 |
| 2013/0279866 | A1 * | 10/2013 | Wells | G02B 6/4403 385/114 |
| 2014/0163132 | A1 * | 6/2014 | Nagelvoort | G02B 1/10 522/173 |
| 2016/0177092 | A1 * | 6/2016 | McCarthy | C08G 18/3206 528/75 |
| 2018/0163075 | A1 * | 6/2018 | Ren | C09D 133/10 |
| 2020/0103588 | A1 * | 4/2020 | Iwaguchi | G02B 6/02395 |
| 2020/0103589 | A1 * | 4/2020 | Iwaguchi | G02B 6/02395 |
| 2021/0191061 | A1 * | 6/2021 | Isaji | C03C 25/1065 |

* cited by examiner

METHOD FOR MANUFACTURING OPTICAL FIBER WITH OXYGEN-STRENGTHENED UV-RESIN COATING

CROSS-REFERENCE TO RELATED APPLICATION

The present application is based upon and claims the benefit of the priority from Japanese patent application No. 2018-182358, filed on Sep. 27, 2018, which is hereby incorporated by reference in its entirety.

TECHNICAL FIELD

The present disclosure relates to a method for manufacturing an optical fiber.

BACKGROUND

JP2012-136401A discloses a resin coat optical fiber provided with a glass optical fiber including a core and a cladding, and a coating resin layer coating the glass optical fiber. The coating resin layer includes a primary layer and a secondary layer formed of an ultraviolet ray curable resin. The primary layer includes two layers of an inner layer and an outer layer. In the resin coat optical fiber, the fracturing of the glass optical fiber is suppressed by increasing a Young's modulus of the inner layer.

JP2006-249265A discloses a liquid curable resin composition for coating an optical fiber. In a case where a coating film is formed on a glass fiber by this resin composition, it is possible to improve the strength of the glass fiber itself.

SUMMARY

A method for manufacturing an optical fiber according to one aspect of the present disclosure is a method for manufacturing an optical fiber including a glass fiber, and a coating resin layer that coats the glass fiber by being in contact with the glass fiber, the method including: a step of increasing a dissolved oxygen concentration in an ultraviolet ray curable resin composition; a step of applying the ultraviolet ray curable resin composition, in which the dissolved oxygen concentration is increased, onto the glass fiber; and a step of curing the ultraviolet ray curable resin composition by irradiating the ultraviolet ray curable resin composition that is applied onto the glass fiber with an ultraviolet ray.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
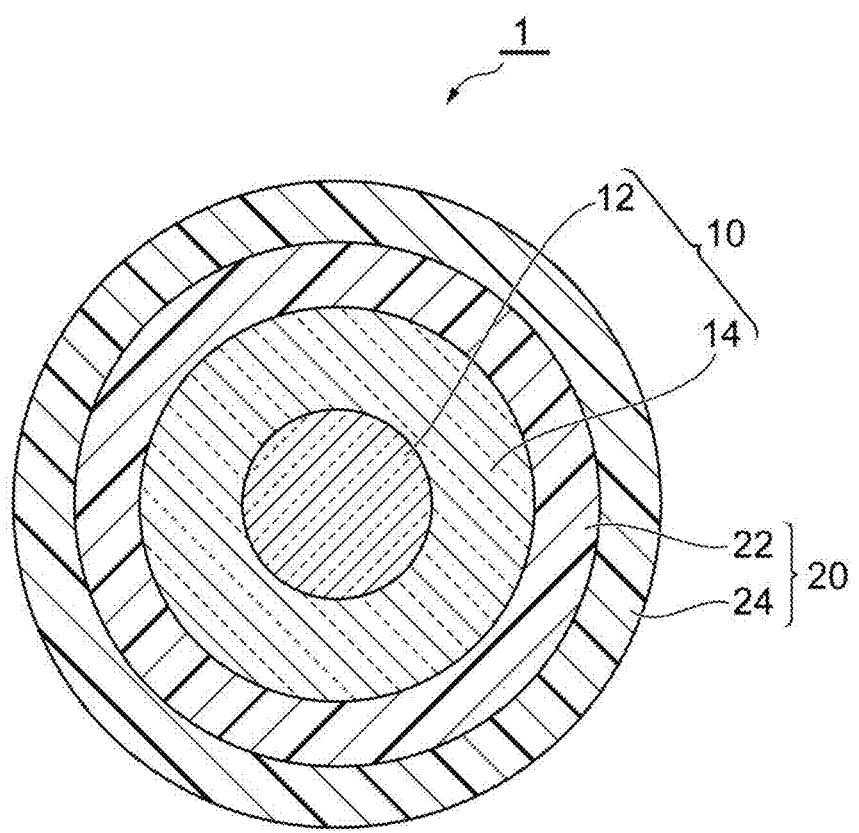
FIG. 1 is a sectional view illustrating a configuration of an optical fiber according to one embodiment.

[Problem to be Solved by the Present Disclosure]

As described above, in the case of using a specific resin composition, a manufacturing step tends to be complicated.

Therefore, an object of the present disclosure is to provide a method for manufacturing an optical fiber that is capable of improving the strength of an optical fiber without using a specific resin composition.

[Advantageous Effect of the Present Disclosure]

According to the present disclosure, it is possible to provide a method for manufacturing an optical fiber that is capable of improving the strength of an optical fiber without using a specific resin composition.

[Description of Embodiments of the Present Disclosure]

First, embodiments of the present invention will be listed and described. A method for manufacturing an optical fiber according to one aspect of the present disclosure is a method for manufacturing an optical fiber including a glass fiber, and a coating resin layer that coats the glass fiber by being in contact with the glass fiber, the method including: a step of increasing a dissolved oxygen concentration in an ultraviolet ray curable resin composition; a step of applying the ultraviolet ray curable resin composition, in which the dissolved oxygen concentration is increased, onto the glass fiber; and a step of curing the ultraviolet ray curable resin composition by irradiating the ultraviolet ray curable resin composition that is applied onto the glass fiber with an ultraviolet ray.

In the method for manufacturing an optical fiber according to the embodiment described above, the dissolved oxygen concentration in the ultraviolet ray curable resin composition is increased, and the coating resin layer is formed by using the ultraviolet ray curable resin composition in which the dissolved oxygen concentration is increased. According to the studies of the present inventors, it is known that the strength of the optical fiber can be improved by forming the coating resin layer by using the ultraviolet ray curable resin composition in which the dissolved oxygen concentration is increased, as described above. Therefore, according to the method for manufacturing an optical fiber according to the embodiment described above, it is possible to improve the strength of the optical fiber without using a specific resin composition.

In one embodiment, in the step of increasing the dissolved oxygen concentration, the dissolved oxygen concentration may increase to be greater than or equal to 1.1 times.

In one embodiment, in the step of increasing the dissolved oxygen concentration, the dissolved oxygen concentration may increase to be greater than or equal to 1.1 times and less than or equal to 8.5 times.

[Detailed Description of the Embodiments of the Present Disclosure]

Hereinafter, specific examples of a method for manufacturing an optical fiber according to an embodiment of the present disclosure will be described in detail with reference to the drawings. The present invention is not limited to such examples, but is represented by the claims, and includes meanings equivalent to the claims and all changes within the claims. In the following description, the same reference numerals will be applied to the same constituents in the description of the drawings, and the repeated description will be omitted.

(Optical Fiber)

FIG. 1 is a sectional view illustrating a configuration of an optical fiber according to one embodiment. In FIG. 1, a sectional surface that is perpendicular to a central axis direction of an optical fiber 1 (an optical axis direction) is illustrated. As illustrated in FIG. 1, the optical fiber 1 of this embodiment includes a glass fiber 10 that is an optical transmission medium, and a coating resin layer 20 that coats the glass fiber 10.

The glass fiber 10 includes a core 12, and a cladding 14 that covers the core 12. The glass fiber 10 is a glass member, and for example, is formed of silica ($SiO_2$) glass. The glass fiber 10 transmits light that is introduced into the optical fiber 1. The core 12, for example, is provided in a region including a central axis line of the glass fiber 10. The core 12, for example, is formed of pure $SiO_2$ glass, or is formed by containing $GeO_2$ and/or a fluorine element, or the like in $SiO_2$ glass. The cladding 14 is provided in a region that surrounds the core 12. The cladding 14 has a refractive index that is lower than a refractive index of the core 12. The cladding 14, for example, is formed of pure $SiO_2$ glass, or $SiO_2$ glass to which a fluorine element is added.

The coating resin layer 20 is an ultraviolet ray curable resin layer that coats the cladding 14. The coating resin layer 20 includes a primary resin layer 22 that coats an outer circumference of the glass fiber 10, and a secondary resin layer 24 that coats an outer circumference of the primary resin layer 22. The primary resin layer 22 is in contact with an outer circumferential surface of the cladding 14, and coats the entire cladding 14. The secondary resin layer 24 is in contact with an outer circumferential surface of the primary resin layer 22, and coats the entire primary resin layer 22. The thickness of the primary resin layer 22, for example, is greater than or equal to 10 μm and less than or equal to 50 μm. The thickness of the secondary resin layer 24, for example, is greater than or equal to 10 μm and less than or equal to 40 μm. The coating resin layer 20 may further include a colored resin layer that coats the outer circumference of the secondary resin layer 24.

The primary resin layer 22 and the secondary resin layer 24, for example, are formed by curing an ultraviolet ray curable resin composition containing an oligomer, a monomer, and a photopolymerization initiator (a reaction initiator).

Urethane (meth)acrylate, epoxy (meth)acrylate, or a mixture thereof can be used as the oligomer. A reactant that is obtained by a reaction in a polyol compound, a polyisocyanate compound, and a hydroxyl group-containing (meth)acrylate compound can be used as the urethane (meth)acrylate.

Polytetramethylene glycol, polypropylene glycol, bisphenol A-ethylene oxide-added diol, and the like can be used as the polyol compound. 2,4-Tolylene diisocyanate, 2,6-tolylene diisocyanate, isophorone diisocyanate, and the like can be used as the polyisocyanate compound. 2-Hydroxy ethyl (meth)acrylate, 2-hydroxy butyl (meth)acrylate, 1,6-hexanediol mono(meth)acrylate, pentaerythritol tri(meth)acrylate, 2-hydroxy propyl (meth)acrylate, tripropylene glycol di(meth)acrylate, and the like can be used as the hydroxyl group-containing (meth)acrylate compound.

A monofunctional monomer having one polymerizable group and a polyfunctional monomer having two or more polymerizable groups can be used as the monomer. Two or more types of such monomers may be used by being mixed.

Examples of the monofunctional monomer include a (meth)acrylate-based monomer such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethyl hexyl (meth)acrylate, n-octyl (meth)acrylate, isooctyl (meth)acrylate, isodecyl (meth)acrylate, lauryl (meth)acrylate, phenoxy ethyl (meth)acrylate, tetrahydrofurfuryl (meth)acrylate, benzyl (meth)acrylate, dicyclopentenyl (meth)acrylate, dicyclopentenyl oxyethyl (meth)acrylate, dicyclopentanyl (meth)acrylate, nonyl phenol polyethylene glycol (meth)acrylate, nonyl phenoxy polyethylene glycol (meth)acrylate, and isobornyl (meth)acrylate; a carboxyl group-containing monomer such as a (meth)acrylic acid, a (meth)acrylic acid dimer, carboxy ethyl (meth)acrylate, carboxy pentyl (meth)acrylate, and co-carboxy-polycaprolactone (meth)acrylate; heterocyclic ring-containing (meth)acrylate such as 3-(3-pyridyl)propyl (meth)acrylate, N-acryloyl morpholine, N-vinyl pyrrolidone, N-vinyl caprolactam, N-acryloyl piperidine, N-methacryloyl piperidine, and N-acryloyl pyrrolidine; a maleimide-based monomer such as maleimide, N-cyclohexyl maleimide, and N-phenyl maleimide; an N-substituted amide-based monomer such as (meth)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylol propane (meth)acrylamide; an aminoalkyl(meth)acrylate-based monomer such as aminoethyl(meth)acrylate, aminoethyl(meth)acrylate, N,N-dimethyl aminoethyl(meth)acrylate, and t-butyl aminoethyl (meth)acrylate; and a succinimide-based monomer such as N-(meth)acryloyl oxymethylene succinimide, N-(meth)acryloyl-6-oxyhexamethylene succinimide, and N-(meth)acryloyl-8-oxyoctamethylene succinimide.

Examples of the polyfunctional monomer include such ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of an alkylene oxide adduct of bisphenol A, tetraethylene glycol di(meth)acrylate, hydroxy pivalate neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate, EO adduct di(meth)acrylate of bisphenol A, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyl oxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone modified tris[(meth)acryloyl oxyethyl]isocyanurate.

The photopolymerization initiator can be used by being suitably selected from known radical photopolymerization initiators. Examples of the photopolymerization initiator include 1-hydroxy cyclohexyl phenyl ketone, 2,2-dimethoxy-2-phenyl acetophenone, 1-(4-isopropyl phenyl)-2-hydroxy-2-methyl propan-1-one, bis(2,6-dimethoxy benzoyl)-2,4,4-trimethyl pentyl phosphine oxide, 2-methyl-1-[4-(methyl thio)phenyl]-2-morpholino-propan-1-one (Irgacure 907, manufactured by BASF SE), 2,4,6-trimethyl benzoyl diphenyl phosphine oxide (Irgacure TPO, manufactured by BASF SE), and bis(2,4,6-trimethyl benzoyl)phenyl phosphine oxide (Irgacure 819, manufactured by BASF SE). Two or more types of such photopolymerization initiators may be used by being mixed, and it is preferable that the photopolymerization initiator contains at least 2,4,6-trimethyl benzoyl diphenyl phosphine oxide.

Figure 2:
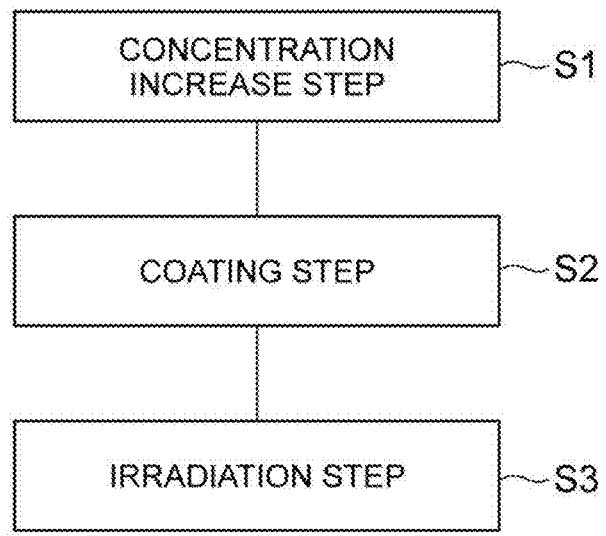
FIG. 2 is a flowchart illustrating a method for manufacturing an optical fiber according to one embodiment.

(Method for Manufacturing Optical Fiber) FIG. 2 is a flowchart illustrating a method for manufacturing an optical fiber according to one embodiment. As illustrated in FIG. 2, a method for manufacturing the optical fiber 1 according to this embodiment includes a concentration increase step S1, a coating step S2, and an irradiation step S3.

First, in the concentration increase step S1, the dissolved oxygen concentration in the ultraviolet ray curable resin composition that is used for forming the coating resin layer 20 is increased. Specifically, at least one of a dissolved oxygen concentration in a first ultraviolet ray curable resin composition that is used for forming the primary resin layer 22 and a dissolved oxygen concentration in a second ultraviolet ray curable resin composition for forming the secondary resin layer 24 is increased. Examples of a method of increasing the dissolved oxygen concentration include a method of pressurizing a resin composition (a resin liquid) that is a target with air or high-concentration oxygen gas, and a bubbling method of injecting air or high-concentration oxygen gas into the resin composition. In the bubbling method, in a case of heating the resin composition, air bubbles are easily formed (subjected to bubbling) in the resin composition. However, in a case where the temperature of the resin composition increases, an oxygen solubility decreases, and thus, for example, the bubbling method may be performed at a room temperature (20° C. to 30° C.) without heating the resin composition.

In the concentration increase step S1, the dissolved oxygen concentration in the ultraviolet ray curable resin composition that is used for forming the coating resin layer 20 is increased to be greater than or equal to 1.1 times and less than or equal to 8.5 times the dissolved oxygen concentration before the concentration increase step S1. Specifically, at least one of the dissolved oxygen concentration in the first ultraviolet ray curable resin composition and the dissolved oxygen concentration in the second ultraviolet ray curable resin composition is increased to be greater than or equal to 1.1 times and less than or equal to 8.5 times the dissolved oxygen concentration before the concentration increase step S1. The dissolved oxygen concentration before the increase may be approximately 5 mg/L. The dissolved oxygen concentration is increased to be greater than or equal to 1.1 times, to be preferably greater than or equal to 1.2 times, and to be more preferably greater than or equal to 1.4 times, and thus, it is possible to improve the strength of the optical fiber 1. In addition, the dissolved oxygen concentration is increased to be less than or equal to 8.5 times, to be preferably less than or equal to 8 times, and to be more preferably less than or equal to 7 times, and thus, it is possible to suppress a decrease in a curing degree of the coating resin layer 20. In a case where the curing degree of the coating resin layer 20 decreases, the coating resin layer 20 may be peeled off or be ruptured at the time of winding the optical fiber 1.

In the coating step S2 subsequent to the concentration increase step S1, the ultraviolet ray curable resin composition in which the dissolved oxygen concentration is increased in the concentration increase step S1 is applied to the glass fiber 10. Specifically, the first ultraviolet ray curable resin composition in which the dissolved oxygen concentration is increased in the concentration increase step S1 is applied onto the surface of the glass fiber 10, and thus, a first layer (a layer corresponding to the primary resin layer 22 after being cured) including the first ultraviolet ray curable resin composition is formed. After that, the second ultraviolet ray curable resin composition in which the dissolved oxygen concentration is increased in the concentration increase step S1 is applied onto the surface of the first layer, and thus, a second layer (a layer corresponding to the secondary resin layer 24 after being cured) including the second ultraviolet ray curable resin composition is formed.

In the irradiation step S3 subsequent to the coating step S2, the ultraviolet ray curable resin composition that is applied onto the glass fiber 10 is irradiated with an ultraviolet ray, and thus, the ultraviolet ray curable resin composition is cured. Specifically, the first layer and the second layer that are applied onto the glass fiber 10 are irradiated with an ultraviolet ray, and thus, the first ultraviolet ray curable resin composition and the second ultraviolet ray curable resin composition are cured. Accordingly, the optical fiber 1 including the glass fiber 10, the primary resin layer 22 formed by curing the first layer, and the secondary resin layer 24 formed by curing the second layer is obtained. For example, an ultraviolet ray LED and an ultraviolet ray lamp are used as an ultraviolet ray light source. A wavelength range of an ultraviolet ray, for example, is 290 nm to 390 nm (a UVA range and a UVB range). An illuminance of an ultraviolet ray, for example, is greater than or equal to 300 $mW/cm^2$ and less than or equal to 1000 $mW/cm^2$. An irradiation time of the ultraviolet ray, for example, is shorter than or equal to 1 second. The ultraviolet ray, for example, is emitted in an inert gas atmosphere such as a nitrogen atmosphere.

According to Steps S1 to S3 described above, the optical fiber 1 of which the strength is improved is obtained without using a specific resin composition.

EXAMPLES

Hereinafter, the present invention will be described in more detail by using examples, but the present invention is not limited to the examples described above.

Example 1

As the concentration increase step, a bubbling method was performed with respect to each of the first ultraviolet ray curable resin composition that is used for forming the primary resin layer and the second ultraviolet ray curable resin composition that is used for forming the secondary resin layer, at a room temperature. The first ultraviolet ray curable resin composition was prepared by mixing 70 parts by mass of a urethane acrylate oligomer as an oligomer, 27 parts by mass of EO modified nonyl phenol acrylate as a monomer, 2.0 parts by mass of 2,4,6-trimethyl benzoyl diphenyl phosphine oxide as a photopolymerization initiator, and 1.0 part by mass of 3-mercaptopropyl trimethoxy silane as a silane coupling agent. The second ultraviolet ray curable resin composition was prepared by mixing 50 parts by mass of urethane acrylate oligomer as an oligomer, 28 parts by mass of epoxy acrylate, 20 parts by mass of isobornyl acrylate as a monomer, and 2.0 parts by mass of 2,4,6-trimethyl benzoyl diphenyl phosphine oxide as a photopolymerization initiator.

A nozzle that was connected to air piping was inserted into a container in which each of the resin compositions was accumulated, and air was fed to each of the resin compositions in a room temperature (25° C.) environment. Accordingly, the dissolved oxygen concentration in each of the resin compositions was increased to 1.5 times the dissolved oxygen concentration before the bubbling. The dissolved oxygen concentration in each of the resin compositions was adjusted by a bubbling time. An oxygen concentration meter for an organic solvent was used for measuring the dissolved oxygen concentration. The oxygen concentration meter for an organic solvent was inserted into each of the resin compositions, and then, a value at the time of being stabilized was set to the dissolved oxygen concentration. The dissolved oxygen concentration after the bubbling was measured in a state where visible air bubbles were removed by performing stirring and defoaming.

Next, as the coating step, the first layer having a thickness of 32.5 μm was formed on the outer circumference of the glass fiber having a diameter of 125 μm and including the core and the cladding, by using the first ultraviolet ray curable resin composition in which the dissolved oxygen concentration was increased. The second layer having a thickness of 27.5 μm was formed on the outer circumference of the first layer by using the second ultraviolet ray curable resin composition in which the dissolved oxygen concentration was increased.

Next, as the irradiation step, the first layer and the second layer were cured by emitting an ultraviolet ray at an illuminance of 300 mW/cm$^2$ for an irradiation time of 0.1 seconds in a nitrogen atmosphere, and thus, the coating resin layer including the primary resin layer and the secondary resin layer was formed. The illuminance of the ultraviolet ray was measured by using an ultraviolet ray intensity meter (a measurement wavelength range of 290 nm to 390 nm (a UVA range and a UVB range)).

Example 2

The optical fiber was manufactured in the same condition as that of Example 1, except that the dissolved oxygen concentration in each of the resin compositions was increased to 1.7 times the dissolved oxygen concentration before the bubbling, in the concentration increase step.

Example 3

The optical fiber was manufactured in the same condition as that of Example 1, except that the dissolved oxygen concentration in each of the resin compositions was increased to 2.3 times the dissolved oxygen concentration before the bubbling, in the concentration increase step.

Example 4

The optical fiber was manufactured in the same condition as that of Example 1, except that the dissolved oxygen concentration in each of the resin compositions was increased to 3.3 times the dissolved oxygen concentration before the bubbling, in the concentration increase step.

Example 5

The optical fiber was manufactured in the same condition as that of Example 1, except that the dissolved oxygen concentration in each of the resin compositions was increased to 5 times the dissolved oxygen concentration before the bubbling, in the concentration increase step.

Example 6

The optical fiber was manufactured in the same condition as that of Example 1, except that the dissolved oxygen concentration in each of the resin compositions was increased to 8 times the dissolved oxygen concentration before the bubbling, in the concentration increase step.

Comparative Example 1

The optical fiber was manufactured in the same condition as that of Example 1, except that the concentration increase step was not performed, each of the resin compositions was heated, and the dissolved oxygen concentration in each of the resin compositions decreased to 0.8 times the dissolved oxygen concentration before the heating.

In the optical fibers of Examples 1 to 6 and Comparative Example 1, respective amounts of increase in a glass strength and respective amounts of decrease in a gel fraction were measured. The amount of increase in the glass strength was obtained as a difference in the glass strength between before and after the dissolved oxygen concentration increase step by measuring the respective glass strengths before and after the dissolved oxygen concentration increase step. The glass strength was measured by performing a tension test with respect to each of the optical fibers to be tested at a tension rate of 25 mm/minute, where the strength at which half of the optical fibers to be tested fracture is considered 50% strength. A gel fraction was calculated as a decrease rate in the weight of the optical fiber by immersing the optical fiber in methyl ethyl ketone (MEK) at 60° C. for 17 hours ((Weight of Optical Fiber before Immersion−Weight of Optical Fiber after Immersion)/Weight of Optical Fiber before Immersion×100). An amount of decrease in the gel fraction can be an index of an amount of decrease in the curing degree.

A ratio of dissolved oxygen concentration (a ratio of the dissolved oxygen concentration after the bubbling to the dissolved oxygen concentration before the bubbling), the amount of increase in the glass strength, and the amount of decrease in the gel fraction of Examples 1 to 6 and Comparative Examples 1 and 2 are shown in Table 1.

TABLE 1

| | Example 1 | Example 2 | Example 3 | Example 4 | Example 5 | Example 6 | Comparative Example 1 |
|---|---|---|---|---|---|---|---|
| Ratio of dissolved oxygen concentration | 1.5 | 1.7 | 2.3 | 3.3 | 5 | 8 | 0.8 |
| Amount of increase in glass strength (kgf) | 0.2 | 0.2 | 0.3 | 0.3 | 0.6 | 0.05 | 0 |
| Amount of decrease in gel fraction (%) | 0 | 0 | 0 | 0 | 1 | 10 | 0 |

In Example 1, the glass strength increased by 0.2 kgf, and the gel fraction did not decrease. In Example 2, the glass strength increased by 0.2 kgf, and the gel fraction did not decrease. In Example 3, the glass strength increased by 0.3 kgf, and the gel fraction did not decrease. In Example 4, the glass strength increased by 0.3 kgf, and the gel fraction did not decrease. In Example 5, the glass strength increased by 0.6 kgf, and the gel fraction decreased by 1%. In Example 6, the glass strength increased by 0.05 kgf, and the gel fraction decreased by 10%. In Comparative Example 1, the glass strength did not increase, and the gel fraction did not decrease.

What is claimed is:

1. A method for manufacturing an optical fiber including a glass fiber, and a coating resin layer that coats the glass fiber by being in contact with the glass fiber, the method comprising:
- a step of increasing a dissolved oxygen concentration in an ultraviolet ray curable resin composition;
- a step of applying the ultraviolet ray curable resin composition, in which the dissolved oxygen concentration is increased, onto the glass fiber; and
- a step of curing the ultraviolet ray curable resin composition by irradiating the ultraviolet ray curable resin composition that is applied onto the glass fiber with an ultraviolet ray.

2. The method for manufacturing an optical fiber according to claim 1,
- wherein in the step of increasing the dissolved oxygen concentration, the dissolved oxygen concentration is increased to be greater than or equal to 1.1 times.

3. The method for manufacturing an optical fiber according to claim 1,
- wherein in the step of increasing the dissolved oxygen concentration, the dissolved oxygen concentration is increased to be greater than or equal to 1.1 times and less than or equal to 8.5 times.

* * * * *